Figure 1:
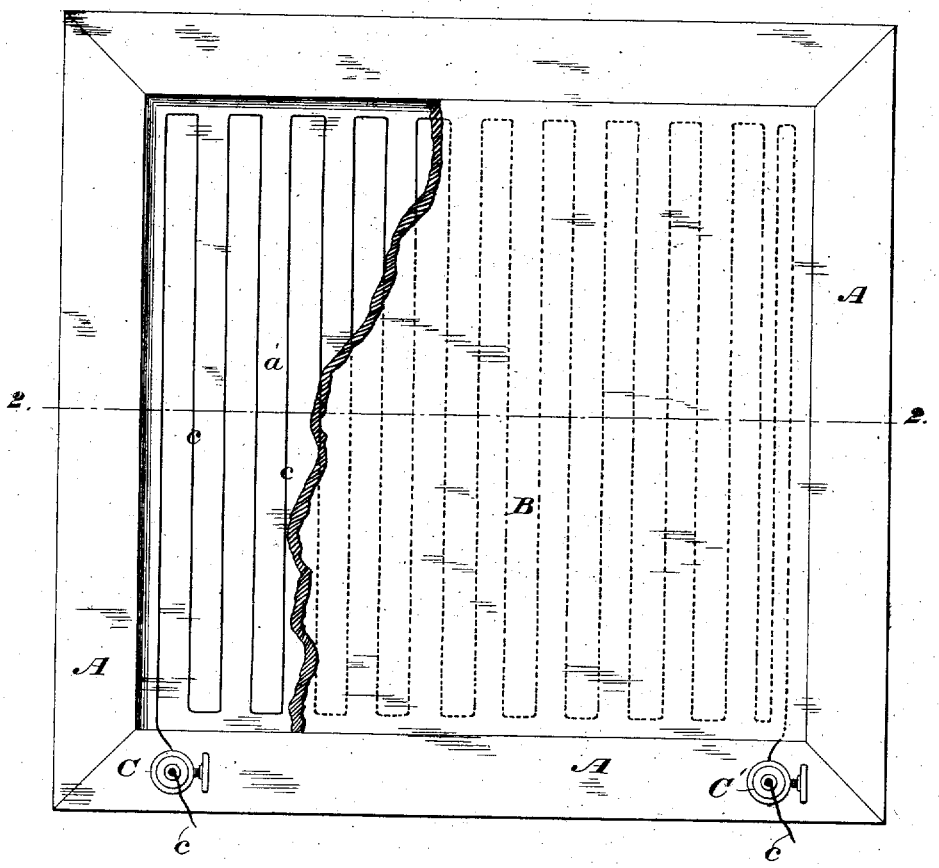

C. T. CHESTER,

Assignor to THE AMERICAN DISTRICT TELEGRAPH CO.

Protecting Safes and Vaults from Burglars.

No. 8,874. Reissued Aug. 26, 1879.

WITNESSES

Wm A. Stinkly.

Geo W Brick

INVENTOR

Charles T. Chester.

By his Attorneys

Baldwin Hopkins & Peyton

THE NORRIS PETERS CO., WASHINGTON, D. C.

UNITED STATES PATENT OFFICE.

CHARLES T. CHESTER, OF ENGLEWOOD, NEW JERSEY, ASSIGNOR TO THE AMERICAN DISTRICT TELEGRAPH COMPANY, OF NEW YORK CITY.

IMPROVEMENT IN PROTECTING SAFES AND VAULTS FROM BURGLARS.

Specification forming part of Letters Patent No. 106,324, dated August 16, 1870; Reissue No. 8,874, dated August 26, 1879; application filed May 26, 1879.

*To all whom it may concern:*

Be it known that I, CHARLES T. CHESTER, of Englewood, in the county of Bergen and State of New Jersey, have invented certain new and useful Improvements in Electrical Apparatus for the Protection of Safes and Vaults from Burglars, of which improvements the following is a specification.

I am aware that prior to the date of my invention devices have been applied to the interiors of houses and vaults for the purpose of breaking and closing electrical circuits to ring a bell or sound an alarm at a place more or less remote from the point of entrance of said houses or vaults. Thus, for instance, doors and windows have been provided with attachments so arranged that, upon altering the position of such attachments, the circuit would be closed and an alarm sounded.

My invention, however, differs from the plan above mentioned, its object being to secure a safe, vault, or chamber containing valuables from the inroads of burglars, who have frequently entered such places by making a hole through the iron or masonry of which the sides or floor of the vault are composed, and escaping before the safe or vault could be reached from the point at which the alarm was sounded.

To attain the object of my invention I cover every portion of the walls, roof, or floor of a safe, vault, or chamber with a net-work of wire or other conductor of electricity, so woven into a fabric or embedded in wood, plaster, or any other material of which the exterior covering of such vault, safe, or chamber may be composed, that if an attack be made on any such protected place as to rupture the protection, the blows inflicted or the cutting or breaking tools employed will cause a variation in or rupture of the electric current, and actuate any of the well-known means of causing an alarm by ringing bells or tripping machinery.

The electric appliance or attachment may be made in various ways. The conductor of electricity may be buried in a wooden panel to be affixed to the safe, care being taken that the attachment of one panel to another is electrically perfect, and at each of such junctions provision may be made for a test of the soundness or completeness of the whole conductor, or the special section of conductor embraced in the special panel or side of the vault or chamber may be tested in the usual way familiar to electricians. The conductor of electricity may be buried in rubber cloth, or between sheets of thick paper, or behind common wall-paper, or in many ways which would be suggested as applicable to different positions where the electrical protector may be required.

I do not confine myself to the particular mode herein described of carrying out the object of my invention, as it is obvious that in the construction of the protecting fabric, lining, or cover, the electrical conducting-lines may be run at different distances apart, according to the exigencies of each particular case.

Figure 2:
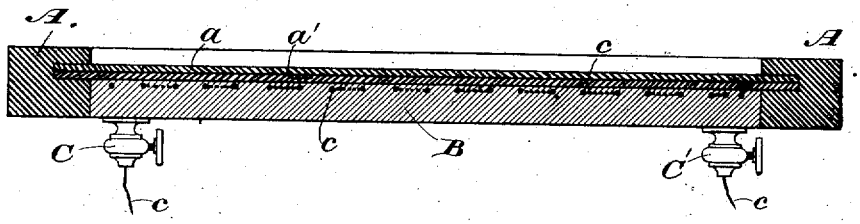

In the accompanying drawings, which show my apparatus as embodied in one of the best forms known to me at the date of the filing of my application for the original patent, Figure 1 represents a view, in elevation, of a panel or the entire side of a safe, with a portion of its exterior covering removed; and Fig. 2, a transverse section therethrough on the line 2 2 of Fig. 1.

The wall-plates *a a'* of the safe are secured in or to the framing A in usual well-known ways. The conductor of electricity shown is composed of a wire, *c*, traversing back and forth across the panel or side of the vault, at short distances apart, and as being embedded in the outer casing or covering, B, of the vault, the conductor at each end being connected with the battery or line wire through or by means of the usual binding-posts C C', or with the corresponding conductor of the adjoining panel or side, top, or bottom of the safe, vault, or chamber, in usual well-known ways. The distance between these adjoining lines of the conductor may be varied, thus protecting the safe against various sizes of holes that may be made in it for various purposes, according to the plan of attack adopted—such, for instance, as the introduction of powder, or of the person of the burglar himself, as through the ceiling of a room beneath the safe or vault.

The obvious advantage of placing the protection outside of the walls of the safe is, that any attempt to rupture the protection would sound the alarm before the safe could be broken open, and thus give timely warning to its guardians.

I do not confine myself to any particular size of the spaces between the different parts of the conductor, nor to any particular fabric or structure in which it may be embedded; but,

Having thus described my improved apparatus, what I claim therein of my own invention is—

1. An electrical conductor embedded in the covering of a vault, safe, or room outside of its protecting walls or shell, which conductor, when ruptured, will produce an electrical alarm in the usual manner before the safe, wall, or shell itself can be attacked.

2. The combination, substantially as hereinbefore set forth, of the safe, wall, or shell and the external protection, consisting of an electrical conductor enveloping the safe, vault, or chamber.

CHARLES T. CHESTER.

Witnesses:
FRANK L. POPE,
WILLIAM ARNOUX.